(12) United States Patent
Zhang

(10) Patent No.: US 9,681,363 B2
(45) Date of Patent: Jun. 13, 2017

(54) METHOD AND APPARATUS FOR MANIPULATING UPLINK SERVICE AREA OF ACCESS NODE IN WIRELESS NETWORK

(71) Applicant: Telefonaktiebolaget L M Ericsson (publ), Stockholm (SE)

(72) Inventor: Zhang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 65 days.

(21) Appl. No.: 14/411,371

(22) PCT Filed: Dec. 18, 2014

(86) PCT No.: PCT/CN2014/094212
§ 371 (c)(1),
(2) Date: Dec. 24, 2014

(87) PCT Pub. No.: WO2016/095158
PCT Pub. Date: Jun. 23, 2016

(65) Prior Publication Data
US 2016/0323809 A1 Nov. 3, 2016

(51) Int. Cl.
*H04W 48/04* (2009.01)
*H04W 48/16* (2009.01)
(Continued)

(52) U.S. Cl.
CPC ........... *H04W 48/16* (2013.01); *H04W 24/10* (2013.01); *H04W 36/0083* (2013.01);
(Continued)

(58) Field of Classification Search
CPC ......................................... H04W 48/00–48/20
See application file for complete search history.

(56) References Cited

U.S. PATENT DOCUMENTS 5,287,544 A * 2/1994 Menich ............... H04W 72/082
455/436
2009/0069012 A1* 3/2009 Tu ........................ H04W 36/30
455/436

(Continued)

FOREIGN PATENT DOCUMENTS

WO 2014005247 A1 1/2014
WO 2014021759 A2 2/2014

OTHER PUBLICATIONS

"Proposed SID: Study on UMTS Heterogeneous Networks," Sep. 4-7, 2012, 5 pages, TSG RAN Meeting #57, RP-121436, Huawei, HiSilicon.

(Continued)

*Primary Examiner* — Lester Kincaid
*Assistant Examiner* — Daniel G Bassett
(74) *Attorney, Agent, or Firm* — Nicholson De Vos Webster & Elliott LLP

(57) ABSTRACT

The present disclosure provides a method and an apparatus for manipulating an Uplink (UL) service area of an access node in a wireless network. The method comprises determining whether a condition for updating a cell list for UL reception of a terminal device in proximity of the access node is met by considering a first set of Cell Individual Offsets (CIOs) for a set of cells. The first set of CIOs for the set of cells are respectively different from a second set of CIOs for the set of cells which are considered in determining whether a condition for changing a serving access node for Downlink (DL) transmission of the terminal device is met. The method further comprises updating the cell list for UL reception of the terminal device according to the determination.

28 Claims, 5 Drawing Sheets

(51) Int. Cl.
*H04W 48/20* (2009.01)
*H04W 36/18* (2009.01)
*H04W 36/00* (2009.01)
*H04W 24/10* (2009.01)

(52) U.S. Cl.
CPC .......... *H04W 48/04* (2013.01); *H04W 48/20* (2013.01); *H04W 36/18* (2013.01)

(56) References Cited

U.S. PATENT DOCUMENTS

2011/0263260 A1\* 10/2011 Yavuz ............... H04W 36/0083
455/437
2014/0206330 A1   7/2014 Chen et al.

OTHER PUBLICATIONS

"3rd Generation Partnership Project; Technical Specification Group Radio Access Network; Radio Resource Control (RRC); Protocol specification (Release 10)," 3GPP TS 25.331 V10.1.0, Sep. 2010, 3GPP Organizational Partners.
International Search Report and Written Opinion for Application No. PCT/CN2014/094212, mailed Sep. 22, 2015, 11 pages.

\* cited by examiner

METHOD AND APPARATUS FOR MANIPULATING UPLINK SERVICE AREA OF ACCESS NODE IN WIRELESS NETWORK

CROSS-REFERENCE TO RELATED APPLICATIONS

This application is a National stage of International Application No. PCT/CN2014/094212, filed Dec. 18, 2014, which is hereby incorporated by reference.

TECHNICAL FIELD

The present disclosure generally relates to the technical field of wireless communications, and particularly, to a method and an apparatus for manipulating an Uplink (UL) service area of an access node in a wireless network.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In wireless communications networks, an access node's UL and Downlink (DL) service areas are closely related to the condition for updating cell lists of terminal devices in proximity of the access node and the condition for changing serving access nodes of the terminal devices. In UL, a terminal device transmits to the access nodes associated with all cells in its cell list. In DL, the terminal device receives from its serving access node.

According to the prior art, in determining whether the condition for updating the cell lists of the terminal devices and the condition for changing their serving access nodes are met, a set of Cell Individual Offsets (CIOs) configured for a set of cells are considered.

To be specific, the condition for updating the cell list of a terminal device may include a condition for adding a cell to the cell list and a condition for removing a cell from the cell list, which may be expressed as the following formulas (1) and (2) respectively. The condition for changing the serving access node of the terminal device may be expressed as the following formula (3).

$$\text{quality}_{CPICH}^{new} + CIO^{new} > \text{quality}_{CPICH}^{best} + CIO^{best} - \text{addhysteresis} \quad (1)$$

$$\text{quality}_{CPICH}^{notbest} + CIO^{notbest} < \text{quality}_{CPICH}^{best} + CIO^{best} - \text{removehysteresis} \quad (2)$$

$$\text{quality}_{CPICH}^{notbest} + CIO^{notbest} > \text{quality}_{CPICH}^{best} + CIO^{best} - \text{switchhysteresis} \quad (3)$$

where $\text{quality}_{CPICH}^{new}$, $\text{quality}_{CPICH}^{notbest}$ and $\text{quality}_{CPICH}^{best}$ respectively denote a quality measurement for a cell not included in the cell list, a quality measurement for a non-best cell in the cell list and a quality measurement for a best cell in the cell list;

$CIO_{first}^{new}$, $CIO_{first}^{notbest}$ and $CIO_{first}^{best}$ respectively denote one of the set of CIOs which corresponds to the cell not included in the cell list, one of the set of CIOs which corresponds to the non-best cell in the cell list and one of the set of CIOs which corresponds to the best cell in the cell list; and addhysteresis, removehysteresis and switchhysteresis respectively denote a hysteresis value delaying the addition of the cell, a hysteresis value delaying the removal of the cell and a hysteresis value delaying the changing of the serving access node.

In certain scenarios, it might be preferable to manipulate the access node's UL service area. By way of illustration rather than limitation, it is preferable for a Low Power Node (LPN) in a heterogeneous network to extend its UL service area.

To illustrate this, FIG. 1 depicts a heterogeneous network comprising a macro base station and several Low Power Nodes (LPNs), each of which may be a Remote Radio Unit (RRU), a pico base station, a micro base stations or the like. Typically, because the transmission power of the macro base station (e.g., 20 W) is much higher than that of the LPN (e.g., 2 W), an inherent macro-LPN imbalance region exists as illustrated in FIG. 2. In that region which is determined by a first border at which the pathloss with respect to the macro base station is equal to the pathloss with respect to the LPN and a second border at which the DL reception power from the macro base station is equal to the DL reception power from the LPN, the UL transmission quality to the LPN is better than the UL transmission quality to the macro base station while the DL transmission quality from the macro base station is better than the DL transmission quality from the LPN.

In DL, terminal devices located in the imbalance region are served solely by the macro base station (i.e., the terminal devices located in the imbalance region receive DL transmissions solely from the macro base station). Thus, the boundary between the DL service areas of the macro base station and the LPN corresponds to the second border of the imbalance region.

In UL, terminal devices located in a Soft Handover (SHO) region which overlaps with the imbalance region are jointly served by the macro base station and the LPN (i.e., the terminal devices located in the SHO region transmit UL transmissions to both the macro base station and the LPN). Thus, the boundary of the LPN's UL service area corresponds to one of the SHO region's two borders which falls into the imbalance region.

To benefit more from the higher quality UL transmissions provided by the LPN in the imbalance region, it is preferable to extend the UL service area of the LPN. To this end, one approach is to increase the CIO for the LPN, which according to the above formulas (1)-(3) is considered not only in determining whether the condition for updating the cell list of the terminal device in proximity of the LPN is met but also in determining whether the condition for changing the serving access node of the terminal device is met. Undesirably, increasing the LPN's CIO also extends the DL service area of the LPN into the macro-LPN imbalance region, and terminal devices located in the extended part of the LPN's DL service area can no longer benefit from the higher quality DL transmissions from the Marco base station.

Another approach for extending the LPN's UL service area is to enlarge the SHO region by increasing addhysteresis and/or removehysteresis in the above formulas (1) and (2). In addition to an extension of the LPN's UL service area, the enlargement of the SHO region leads to an extension of the macro base station's UL service area, causing increased processing cost. Moreover, the addition of the macro base station into the cell list might prevent the LPN from being added because the cell list might be full after the addition of the macro base station. Accordingly, it is still impossible to benefit from the higher equality UL transmissions provided by the LPN in the imbalance region.

From the perspective of the macro base station, the approach to contract the macro base station's UL service area by decreasing its CIO may undesirably cause the contraction of the macro base station' DL service area. The approach to contract the macro base station's UL service area by diminishing the SHO region may undesirably cause the contraction of the LPN's UL service area.

SUMMARY

In view of the foregoing, an object of the present disclosure is to overcome at least one of the above-described drawbacks of the existing approaches for manipulating the UL service area of an access node.

To achieve this object, according to a first aspect of the present disclosure, there is provided a method for manipulating a UL service area of an access node in a wireless network. The method comprises determining whether a condition for updating a cell list for UL reception of a terminal device in proximity of the access node is met by considering a first set of CIOs for a set of cells. The first set of CIOs for the set of cells are respectively different from a second set of CIOs for the set of cells which are considered in determining whether a condition for changing a serving access node for DL transmission of the terminal device is met. The method further comprises updating the cell list for UL reception of the terminal device according to the determination.

According to a second aspect of the present disclosure, there is provided an apparatus for manipulating a UL service area of an access node in a wireless network. The apparatus comprises a determination section and an updating section. The determination section is configured to determine whether a condition for updating a cell list for UL reception of a terminal device in proximity of the access node is met by considering a first set of CIOs for a set of cells. The first set of CIOs for the set of cells are different from a second set of CIOs for the set of cells which are considered in determining whether a condition for changing a serving access node for DL transmission of the terminal device is met. The updating section is configured to update the cell list for UL reception of the terminal device according to the determination.

With the proposed method and apparatus, the terminal device in proximity of the access node may have its cell list for UL reception updated by considering the first set of CIOs while having its serving access node for DL transmission changed by considering the second set of CIOs. Because the first set of CIOs are respectively different from the second set of CIOs for the same set of cells, the updating of the terminal device's cell list for UL reception may be performed independently from the changing of the terminal's serving access node for DL transmission. Accordingly, the access node's UL service area can be manipulated (either extended or contracted) without adversely affecting its DL service area.

Additionally, with the proposed method and apparatus, the access node's UL service area can be manipulated without changing the size of the SHO region and thus without adversely affecting the UL service area of another access node adjacent to the access node.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Figure 1:
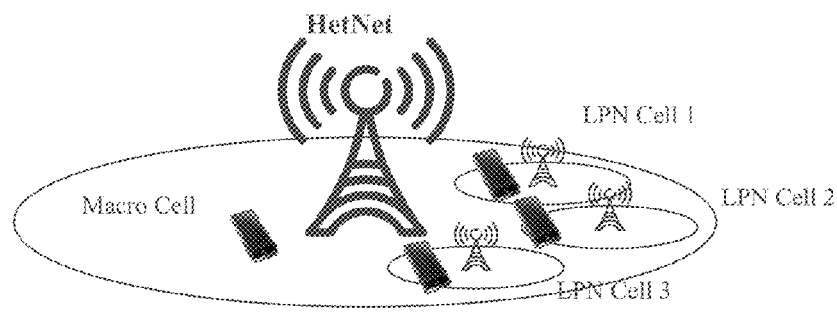
FIG. 1 is a schematic diagram illustrating a heterogeneous network comprising a macro base station and several LPNs.
Figure 2:
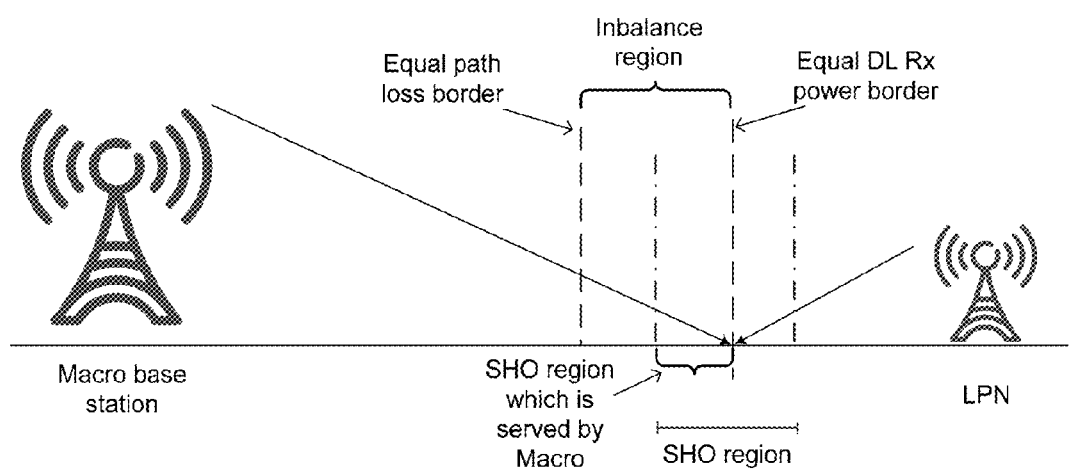
FIG. 2 is a schematic diagram illustrating a macro-LPN imbalance region and an SHO region formed between the macro base station and one of the LPNs in the heterogeneous network.

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Since various wireless systems may benefit from exploiting the ideas covered within this disclosure as will be appreciated by those skilled in the art, terms like "access node" and "terminal device" as used herein should be understood in a broad sense. Specifically, the access node should be understood to encompass a legacy base station in a Second Generation (2G) network, a NodeB in a Third Generation (3G) network, an evolved NodeB in an evolved 3G network, an access point in a Wireless Local Area Network (WLAN), and the like. The terminal device should be understood to encompass a mobile telephone, a smartphone, a wireless-enabled tablet or personal computer, a wireless machine-to-machine unit, and the like.

Figure 3:
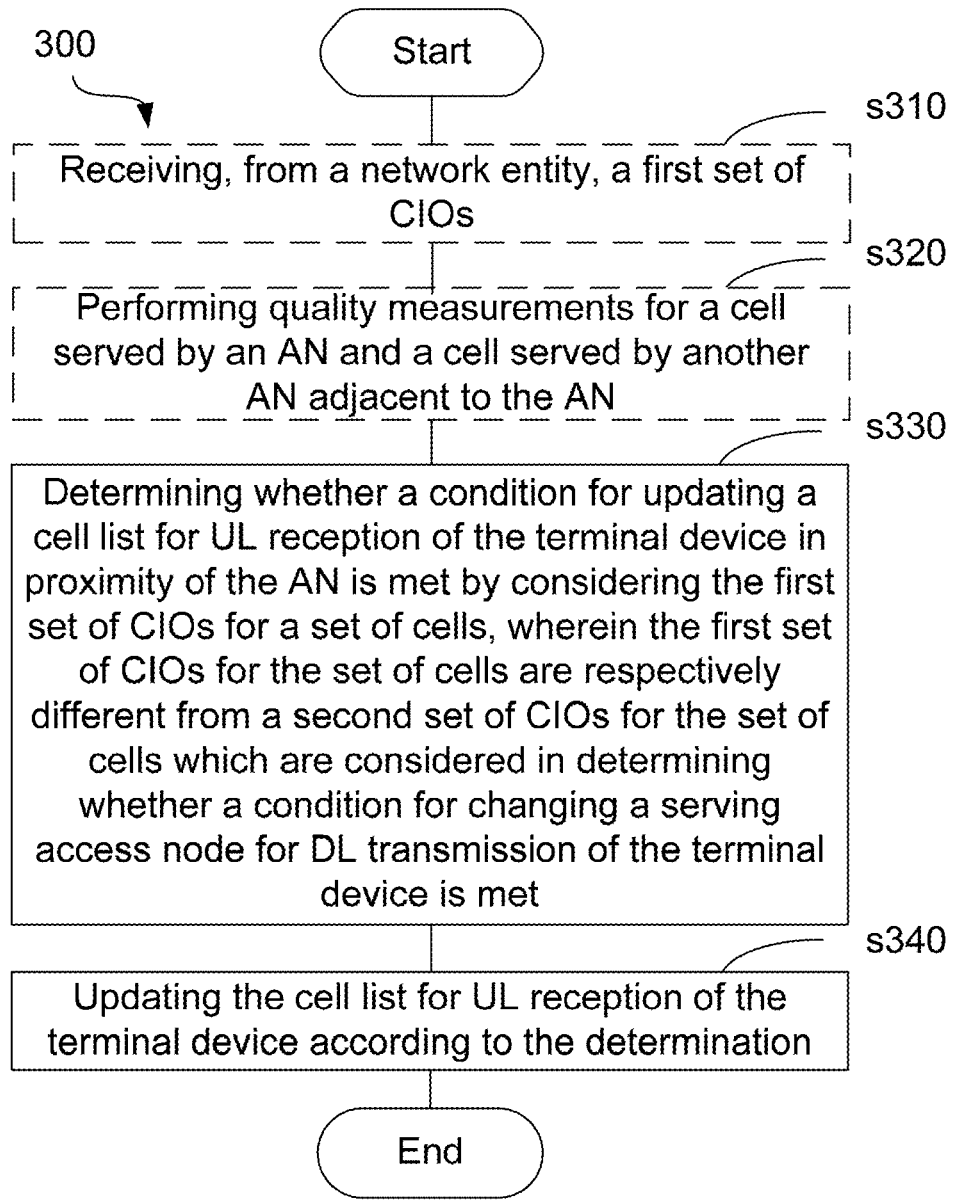
FIG. 3 is flowchart illustrating a method for manipulating a UL service area of an access node in a wireless network according to an embodiment of the present disclosure.

In the following, a method 300 for manipulating a UL service area of an access node in a wireless network according to the present disclosure will be described with reference to FIG. 3.

As illustrated, the method 300 comprises steps s330 and s340. At step s330, it is determined, for a terminal device in proximity of the access node, whether a condition for updating the terminal device's cell list for UL reception is met by considering a first set of CIOs for a set of cells. The first set of CIOs for the set of cells are respectively different from a second set of CIOs for the set of cells which are considered in determining whether a condition for changing the terminal device's serving access node for DL transmission is met. At step s340, the terminal device's cell list for UL reception is updated according to the determination made at step s330.

Unlike the prior art where a single set of CIOs are considered both in updating the terminal device's cell list for UL reception and in changing its serving access node for DL transmission, the proposed method updates the terminal device's cell list for UL reception by considering the first set of CIOs which are respectively different from the second set of CIOs considered in changing the terminal device's serving access node for DL transmission. As such, the updating of the terminal device's cell list for UL reception is enabled to be performed independently from the changing of the terminal's serving access node for DL transmission. Accordingly, the access node's UL service area can be manipulated (either extended or contracted) without adversely affecting its DL service area.

Additionally, with the proposed method, the access node's UL service area can be manipulated without changing the size of the SHO region and thus without adversely affecting the UL service area of another access node adjacent to the access node.

In an embodiment, the condition for updating the terminal device's the cell list for UL reception may include a condition for adding a cell to the cell list and/or a condition for removing a cell from the cell list.

Figure 4:
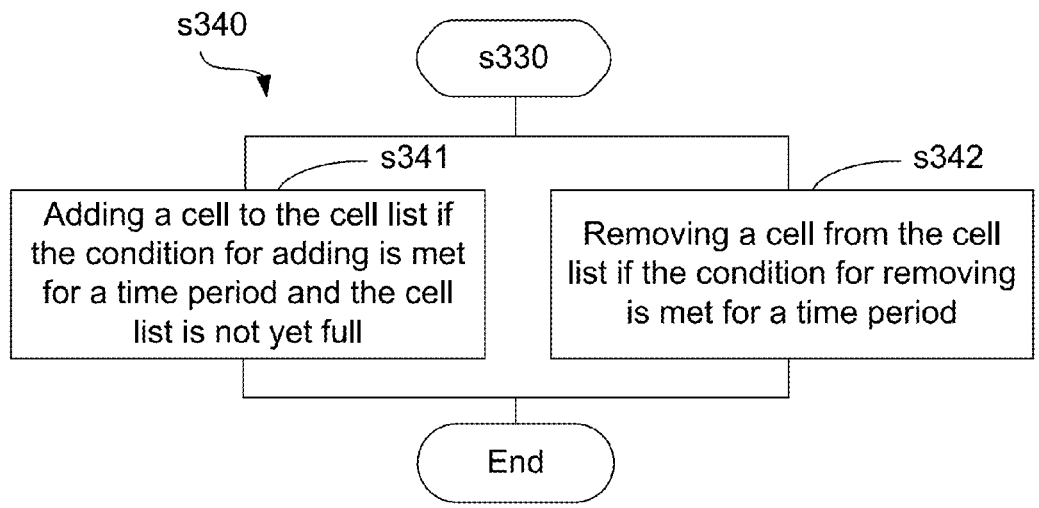
FIG. 4 is a flowchart illustrating in more detail a step of the method shown in FIG. 3.

Accordingly, the step s340 may comprise substeps s341 and s342 as illustrated in FIG. 4. At step s341, a cell is added to the cell list if the condition for adding is met for a time period and the cell list is not yet full. At step s342, a cell is removed from the cell list if the condition for removing is met for a time period. As such, by setting the time periods appropriately, it is possible to achieve a tradeoff between the swiftness and the reliability of the cell list updating.

In an embodiment, the condition for adding a cell to the cell list and the condition for removing a cell from the cell list may be expressed as the following formulas (4) and (5) respectively, and the condition for changing the serving access node may be expressed as the following formula (6).

$$\text{quality}_{CPICH}^{new} + CIO_{first}^{new} > \text{quality}_{CPICH}^{best} + CIO_{first}^{best} - \text{addhysteresis} \quad (4)$$

$$\text{quality}_{CPICH}^{notbest} + CIO_{first}^{notbest} < \text{quality}_{CPICH}^{best} + CIO_{first}^{best} - \text{removehysteresis} \quad (5)$$

$$\text{quality}_{CPICH}^{notest} + CIO_{second}^{notbest} > \text{quality}_{CPICH}^{best} + CIO_{second}^{best} + \text{switchhysteresis} \quad (6)$$

where
$\text{quality}_{CPICH}^{new}$, $\text{quality}_{CPICH}^{notbest}$ and $\text{quality}_{CPICH}^{best}$ respectively denote a quality measurement for a cell not included in the cell list, a quality measurement for a non-best cell in the cell list and a quality measurement for a best cell in the cell list;

$CIO_{first}^{new}$, $CIO_{first}^{notbest}$ and $CIO_{first}^{best}$ respectively denote one of the first set of CIOs which corresponds to the cell not included in the cell list, one of the first set of CIOs which corresponds to the non-best cell in the cell list and one of the first set of CIOs which corresponds to the best cell in the cell list;

$CIO_{second}^{notbest}$ and $CIO_{second}^{best}$ respectively denote one of the second set of CIOs which corresponds to the non-best cell in the cell list and one of the second set of CIOs which corresponds to the best cell in the cell list; and addhysteresis, removehysteresis and switchhysteresis respectively denote a hysteresis value delaying the addition of the cell, a hysteresis value delaying the removal of the cell and a hysteresis value delaying the changing of the serving access node.

By way of illustration rather than limitation, the quality measurement for a cell may be CPICH (Common Pilot CHannel) Ec/Io or CPICH RSCP (Received Signal Code Power) measured for the cell.

In an embodiment, the first set of CIOs for the set of cells may be formed by adding a third set of CIOs for the set of cells respectively to the second set of CIOs for the set of cells. That is, for each of the set of cells, the formula $CIO_{first} = CIO_{second} + CIO_{third}$ holds true, where $CIO_{first}$, $CIO_{second}$ and $CIO_{third}$ denote the cell's CIOs in the respective sets of CIOs.

Figure 5:
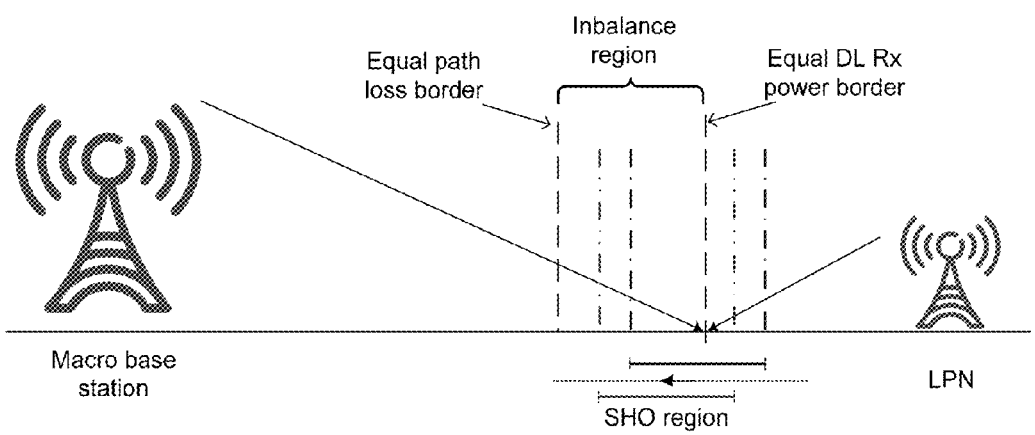
FIG. 5 is a schematic diagram illustrating an exemplary result of applying the method of FIG. 3 to extend a UL service area of an LPN in the heterogeneous network without adversely affecting the LPN's DL service area and the macro base station's UL service area.

In an embodiment, the first set of CIOs for the set of cells may include an increased CIO for a cell served by the access node and/or a decreased CIO for a cell served by another access node adjacent to the access node. Such a solution is particularly suitable to be applied in a heterogeneous wireless network, which comprises an LPN as the access node and a non-LPN (e.g., a macro base station) as said another access node. As illustrated in FIG. 5, by applying the above solution, the SHO region is moved towards the macro base station while its size remains unchanged. Accordingly, the LPN's UL service area is extended without adversely affecting the LPN's DL service area and the macro base station's UL service area.

As those skilled in the art will appreciate, the above solution is also applicable to a homogeneous wireless network where the access node and said another access node are the same type of access nodes with similar transmission powers.

In an embodiment, the steps s330 and s340 may be performed by the terminal device. In that case, the terminal device needs to know the first set of CIOs. Accordingly, the method 300 may further comprise s310 and s320 as illustrated in FIG. 3. At step s310, the first set of CIOs are received from a network entity (for example, from a central control node coordinating the access nodes in the wireless network or from the respective access nodes). At step s320, quality measurements are performed for the cell served by the access node and the cell served by said another access node. The quality measurements are used in step s330 to determine whether the condition for updating is met.

Figure 6:
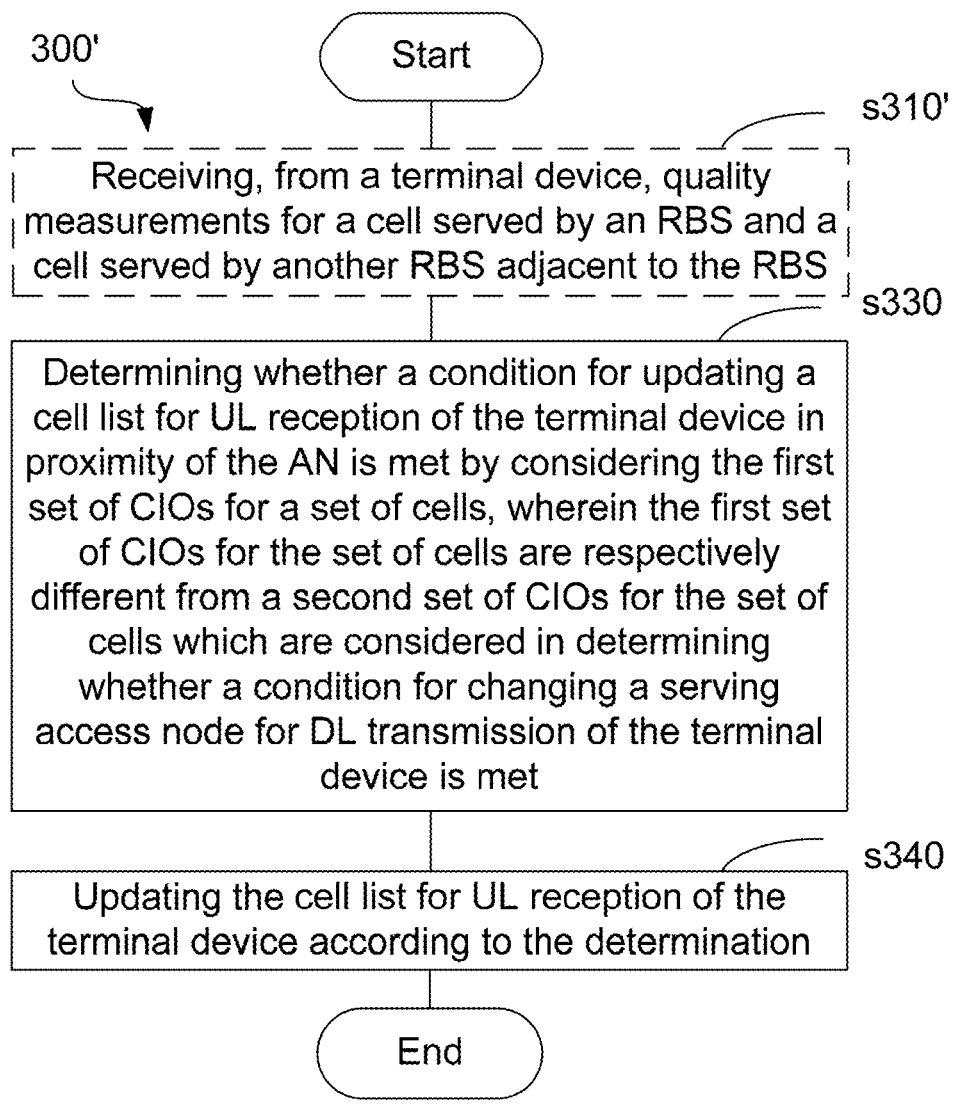
FIG. 6 is a flowchart illustrating a method for manipulating a UL service area of an access node in a wireless network according to another embodiment of the present disclosure.

In another embodiment, instead of being performed by the terminal device, steps s330 and s340 may be performed by a network entity at the network side. In that case, the terminal device is not aware of the first set of CIOs. Instead, the network entity knowing the first set of CIOs receives, from the terminal device, quality measurements for the cell served by the access node and the cell served by said another access node. For the sake of clarity, this is illustrated as step s310' of a method 300' shown in FIG. 6. Then, the received quality measurements are used in step s330 to determine whether the condition for updating is met.

In practical implementation, the quality measurements for the cell served by the access node and the cell served by said another access node may be periodically reported from the terminal device.

As an enhanced implementation which further reduces the amount of resources required for transmitting the quality measurements, the periodical reporting of the quality measurements may be event triggered.

Specifically, in case the terminal device is served by the access node, the quality measurements for the cell served by the access node and the cell served by said another access node may be reported after it is determined that a condition for adding said another access node to the cell list is met by considering the second set of CIOs.

Supposing the terminal device is aware of the second set of CIOs and triggers events 1a, 1b and 1d as in the prior art based on the determination of whether the conditions expressed as the above formulas (1)-(3) are met by considering the second set of CIOs, the reporting of the quality measurements may be started when the event 1a is triggered.

Further, the reporting of the quality measurements may be stopped after it is determined that the condition for adding said another access node to the cell list is met by considering the first set of CIOs.

In case the terminal device is served by said another access node, the quality measurements for the cell served by the access node and the cell served by said another access node may be reported after it is determined that a condition for removing said access node from the cell list is met by considering the second set of CIOs. For example, the reporting of the quality measurements may be started when the event 1b is triggered at the terminal device which uses the second set of CIOs in determining whether the conditions expressed as the above formulas (1)-(3) are met. Further, the reporting of the quality measurements may be stopped after it is determined that the condition for removing said access node from the cell list is met by considering the first set of CIOs.

In case the terminal device is served by said another access node, the quality measurements for the cell served by the access node and the cell served by said another access node may be reported after the terminal device determines that a condition for changing the terminal device's serving AN from said another access node to the access node is met. For example, the reporting of the quality measurements may be started when the event 1d is triggered at the terminal device which uses the second set of CIOs in determining whether the conditions expressed as the above formulas (1)-(3) are met. Further, the reporting of the quality measurements may be stopped after it is determined that the condition for removing said another access node from the cell list is met by considering the first set of CIOs.

In the heterogeneous wireless network scenario where the access node is an LPN and said another access node is a non-LPN, the quality measurements for the cell served by the LPN and the cell served by the non-LPN may be reported in case the terminal device is served by the non-LPN and no LPN exists in the cell list.

In the following, two possible structures of an apparatus for manipulating a UL service area of an access node in a wireless network according to the present disclosure will be described with reference to FIGS. 7 and 8, wherein the apparatus is denoted as apparatus 700 and apparatus 700' respectively.

Figure 7:
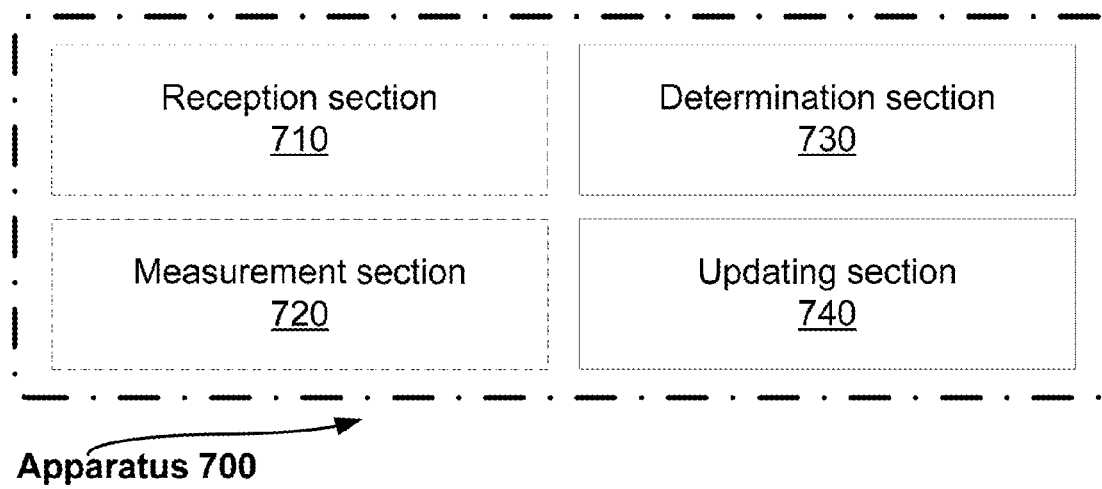
FIGS. 7 and 8 are block diagrams illustrating structures of exemplary apparatus for manipulating a UL service area of an access node in a wireless network according to embodiments of the present disclosure.
Figure 8:
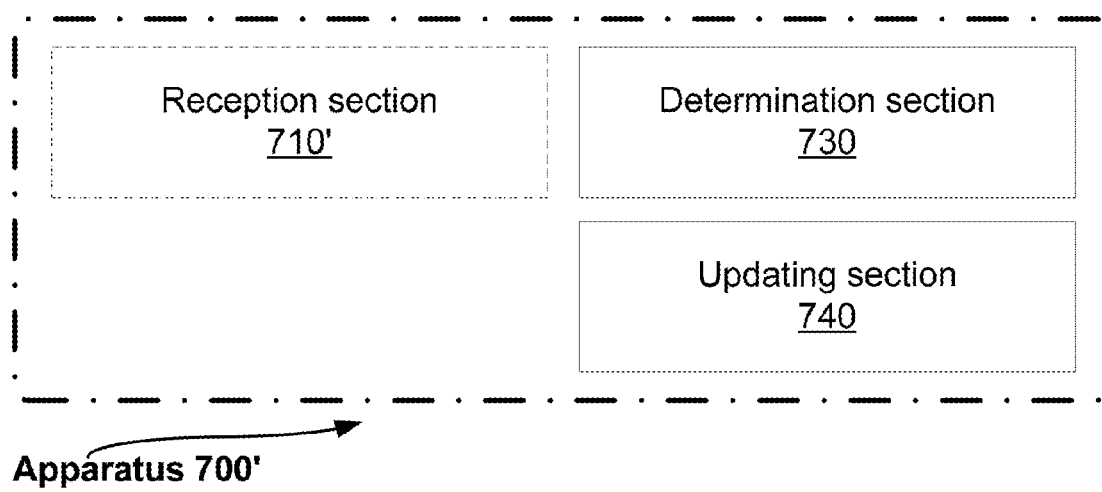

As illustrated in FIGS. 7 and 8, both the apparatus 700 and the apparatus 700' comprise a determination section 730 and an updating section 740. The determination section 730 is configured to determine whether a condition for updating a cell list for UL reception of a terminal device in proximity of the access node is met by considering a first set of CIOs for a set of cells. The first set of CIOs for the set of cells are different from a second set of CIOs for the set of cells which are considered in determining whether a condition for changing a serving access node for DL transmission of the terminal device is met. The updating section is configured to update the cell list for UL reception of the terminal device according to the determination.

In an embodiment, the first set of CIOs for the set of cells may be formed by adding a third set of CIOs for the set of cells respectively to the second set of CIOs for the set of cells.

In an embodiment, the first set of CIOs for the set of cells may include an increased CIO for a cell served by the access node and/or a decreased CIO for a cell served by another access node adjacent to the access node.

In an embodiment, said wireless network may be a heterogeneous wireless network, said access node may be an LPN and said another access node may be a non-LPN.

In an embodiment, the condition for updating the cell list for UL reception of the terminal device may include a condition for adding a cell to the cell list or a condition for removing a cell from the cell list.

The specific conditions for adding a cell to the cell list and/or for removing a cell from the cell list, which are set forth above with respect to methods 300 and 300', are also applicable for the apparatus 700 and 700'.

In an embodiment, the updating section 740 may be configured to add a cell to the cell list if the condition for adding is met for a time period and the cell list is not yet full and remove a cell from the cell list if the condition for removing is met for a time period.

In an embodiment, the apparatus 700 may be the terminal device and may further comprise a reception section 710 and a measurement section 720 as illustrated in FIG. 7. The reception section 710 may be configured to receive, from a network entity, the first set of CIOs. The measurement section 720 may be configured to perform quality measurements for the cell served by said access node and the cell served by said another access node. The quality measurements are used in determining whether the condition for updating is met.

In an embodiment, the apparatus 700' may be a network entity and may further comprise a reception section 710'.

The reception section 710' may be configured to receive, from the terminal device, quality measurements for the cell served by said access node and the cell served by said another access node. The quality measurements are used in determining whether the condition for updating is met.

As those skilled in the art will appreciate, the above-described sections of the apparatus 700 or 700' may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the apparatus may comprise a memory, a processor (including but not limited to a microprocessor, a microcontroller or a Digital Signal Processor (DSP), etc.) and a transceiver. The memory stores machine-readable program code executable by the processor to cause the apparatus to perform the above-described method 300 or 300'.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method for manipulating an Uplink (UL) service area of an access node in a wireless network, the method comprising:
   determining whether a condition for updating a cell list for UL reception of a terminal device in proximity of the access node is met by considering a first set of Cell Individual Offsets (CIOs) for a set of cells, wherein the first set of CIOs for the set of cells are respectively different from a second set of CIOs for the set of cells which are considered in determining whether a condition for changing a serving access node for Downlink (DL) transmission of the terminal device is met, wherein the condition for updating the cell list for UL reception of the terminal device includes a condition for adding a cell to the cell list that includes $$\text{quality}_{CPICH}^{new} + CIO_{first}^{new} > \text{quality}_{CPICH}^{best} + CIO_{first}^{best} - \text{addhysteresis}$$

where
   $\text{quality}_{CPICH}^{new}$ and $\text{quality}_{CPICH}^{best}$ respectively denote a quality measurement for a cell not included in the cell list and a quality measurement for a best cell in the cell list,
   $CIO_{first}^{new}$ and $CIO_{first}^{best}$ respectively denote one of the first set of CIOs which corresponds to the cell not included in the cell list and one of the first set of CIOs which corresponds to the best cell in the cell list, and
   addhysteresis denotes a hysteresis value delaying the addition of the cell; and
   updating the cell list for UL reception of the terminal device according to the determination.

2. The method of claim 1, wherein the first set of CIOs for the set of cells are formed by adding a third set of CIOs for the set of cells respectively to the second set of CIOs for the set of cells.

3. The method of claim 1, wherein the first set of CIOs for the set of cells includes at least one of an increased CIO for a cell served by the access node and a decreased CIO for a cell served by another access node adjacent to the access node.

4. The method of claim 3, wherein said wireless network is a heterogeneous wireless network, said access node is a Low Power Node (LPN) and said another access node is a non-LPN.

5. The method of claim 1, wherein the updating the cell list for UL reception of the terminal device according to the determination comprises:
   adding the cell to the cell list if the condition for adding is met for a time period and the cell list is not yet full.

6. The method of claim 3, wherein the method is implemented in the terminal device and further comprises:
   receiving, from a network entity, the first set of CIOs; and
   performing quality measurements for the cell served by said access node and the cell served by said another access node, wherein the quality measurements are used in determining whether the condition for updating is met.

7. The method of claim 3, wherein the method is implemented in a network entity and further comprises:
   receiving, from the terminal device, quality measurements for the cell served by said access node and the cell served by said another access node, wherein the quality measurements are used in determining whether the condition for updating is met.

8. An apparatus for manipulating an Uplink (UL) service area of an access node in a wireless network, the apparatus comprising:
   a determination section configured to determine whether a condition for updating a cell list for UL reception of a terminal device in proximity of the access node is met by considering a first set of Cell Individual Offsets (CIOs) for a set of cells, wherein the first set of CIOs for the set of cells are different from a second set of CIOs for the set of cells which are considered in determining whether a condition for changing a serving access node for Downlink (DL) transmission of the terminal device is met, wherein the condition for updating the cell list for UL reception of the terminal device includes a condition for adding a cell to the cell list that includes $$\text{quality}_{CPICH}^{new} + CIO_{first}^{new} > \text{quality}_{CPICH}^{best} + CIO_{first}^{best} - \text{addhysteresis}$$

where
   $\text{quality}_{CPICH}^{new}$ and $\text{quality}_{CPICH}^{best}$ respectively denote a quality measurement for a cell not included in the cell list and a quality measurement for a best cell in the cell list,
   $CIO_{first}^{new}$ and $CIO_{first}^{best}$ and respectively denote one of the first set of CIOs which corresponds to the cell not included in the cell list and one of the first set of CIOs which corresponds to the best cell in the cell list, and
   addhysteresis denotes a hysteresis value delaying the addition of the cell; and
   an updating section configured to update the cell list for UL reception of the terminal device according to the determination.

9. The apparatus of claim 8, wherein the first set of CIOs for the set of cells are formed by adding a third set of CIOs for the set of cells respectively to the second set of CIOs for the set of cells.

10. The apparatus of claim 8, wherein the first set of CIOs for the set of cells includes at least one of an increased CIO for a cell served by the access node and a decreased CIO for a cell served by another access node adjacent to the access node.

11. The apparatus of claim 10, wherein said wireless network is a heterogeneous wireless network, said access node is a Low Power Node (LPN) and said another access node is a non-LPN.

12. The apparatus of claim 8, wherein the updating section is configured to
add the cell to the cell list if the condition for adding is met for a time period and the cell list is not yet full.

13. The apparatus of claim 10, wherein the apparatus is the terminal device and further comprises:
a reception section configured to receive, from a network entity, the first set of CIOs; and
a measurement section configured to perform quality measurements for the cell served by said access node and the cell served by said another access node, wherein the quality measurements are used in determining whether the condition for updating is met.

14. The apparatus of claim 10, wherein the apparatus is a network entity and further comprises:
a reception section configured to receive, from the terminal device, quality measurements for the cell served by said access node and the cell served by said another access node, wherein the quality measurements are used in determining whether the condition for updating is met.

15. A method for manipulating an Uplink (UL) service area of an access node in a wireless network, the method comprising:
determining whether a condition for updating a cell list for UL reception of a terminal device in proximity of the access node is met by considering a first set of Cell Individual Offsets (CIOs) for a set of cells, wherein the first set of CIOs for the set of cells are respectively different from a second set of CIOs for the set of cells which are considered in determining whether a condition for changing a serving access node for Downlink (DL) transmission of the terminal device is met, wherein the condition for updating the cell list for UL reception of the terminal device includes a condition for removing a cell from the cell list that includes:

$$\text{quality}_{CPICH}^{notbest} + CIO_{first}^{notbest} < \text{quality}_{CPICH}^{best} + CIO_{first}^{best} - \text{removehysteresis}$$

where
$\text{quality}_{CPICH}^{notbest}$ and $\text{quality}_{CPICH}^{best}$ respectively denote a quality measurement for a non-best cell in the cell list and a quality measurement for the best cell in the cell list,
$CIO_{first}^{notbest}$ and $CIO_{first}^{best}$ first and first respectively denote one of the first set of CIOs which corresponds to the non-best cell in the cell list and one of the first set of CIOs which corresponds to the best cell in the AS, and
removehysteresis denotes a hysteresis value delaying the removal of the cell; and
updating the cell list for UL reception of the terminal device according to the determination.

16. The method of claim 15, wherein the first set of CIOs for the set of cells are formed by adding a third set of CIOs for the set of cells respectively to the second set of CIOs for the set of cells.

17. The method of claim 15, wherein the first set of CIOs for the set of cells includes at least one of an increased CIO for a cell served by the access node and a decreased CIO for a cell served by another access node adjacent to the access node.

18. The method of claim 17, wherein said wireless network is a heterogeneous wireless network, said access node is a Low Power Node (LPN) and said another access node is a non-LPN.

19. The method of claim 15, wherein the updating the cell list for UL reception of the terminal device according to the determination comprises:
removing the cell from the cell list if the condition for removing is met for a time period.

20. The method of claim 17, wherein the method is implemented in the terminal device and further comprises:
receiving, from a network entity, the first set of CIOs; and
performing quality measurements for the cell served by said access node and the cell served by said another access node, wherein the quality measurements are used in determining whether the condition for updating is met.

21. The method of claim 17, wherein the method is implemented in a network entity and further comprises:
receiving, from the terminal device, quality measurements for the cell served by said access node and the cell served by said another access node, wherein the quality measurements are used in determining whether the condition for updating is met.

22. An apparatus for manipulating an Uplink (UL) service area of an access node in a wireless network, the apparatus comprising:
a determination section configured to determine whether a condition for updating a cell list for UL reception of a terminal device in proximity of the access node is met by considering a first set of Cell Individual Offsets (CIOs) for a set of cells, wherein the first set of CIOs for the set of cells are different from a second set of CIOs for the set of cells which are considered in determining whether a condition for changing a serving access node for Downlink (DL) transmission of the terminal device is met, wherein the condition for updating the cell list for UL reception of the terminal device includes a condition for removing a cell from the cell list that includes $$\text{quality}_{CPICH}^{notbest} + CIO_{first}^{notbest} < \text{quality}_{CPICH}^{best} + CIO_{first}^{best} - \text{removehysteresis}$$

where
$\text{quality}_{CPICH}^{notbest}$ and $\text{quality}_{CPICH}^{best}$ respectively denote a quality measurement for a non-best cell in the cell list and a quality measurement for the best cell in the cell list;
$CIO_{first}^{notbest}$ and $CIO_{first}^{best}$ respectively denote one of the first set of CIOs which corresponds to the non-best cell in the cell list and one of the first set of CIOs which corresponds to the best cell in the AS; and
removehysteresis denotes a hysteresis value delaying the removal of the cell; and
an updating section configured to update the cell list for UL reception of the terminal device according to the determination.

23. The apparatus of claim 22, wherein the first set of CIOs for the set of cells are formed by adding a third set of CIOs for the set of cells respectively to the second set of CIOs for the set of cells.

24. The apparatus of claim 22, wherein the first set of CIOs for the set of cells includes at least one of an increased CIO for a cell served by the access node and a decreased CIO for a cell served by another access node adjacent to the access node.

25. The apparatus of claim 24, wherein said wireless network is a heterogeneous wireless network, said access node is a Low Power Node (LPN) and said another access node is a non-LPN.

26. The apparatus of claim 22, wherein the updating section is configured to remove the cell from the cell list if the condition for removing is met for a time period.

27. The apparatus of claim 24, wherein the apparatus is the terminal device and further comprises:
   a reception section configured to receive, from a network entity, the first set of CIOs; and
   a measurement section configured to perform quality measurements for the cell served by said access node and the cell served by said another access node, wherein the quality measurements are used in determining whether the condition for updating is met.

28. The apparatus of claim 24, wherein the apparatus is a network entity and further comprises:
   a reception section configured to receive, from the terminal device, quality measurements for the cell served by said access node and the cell served by said another access node, wherein the quality measurements are used in determining whether the condition for updating is met.

* * * * *

UNITED STATES PATENT AND TRADEMARK OFFICE
CERTIFICATE OF CORRECTION

PATENT NO. : 9,681,363 B2  
APPLICATION NO. : 14/411371  
DATED : June 13, 2017  
INVENTOR(S) : Zhang Page 1 of 1

It is certified that error appears in the above-identified patent and that said Letters Patent is hereby corrected as shown below:

In Fig. 5, Sheet 3 of 5, delete "Inbalance" and insert -- Imbalance --, therefor.

In Column 3, Line 8, delete "station'" and insert -- station's --, therefor.

In Column 4, Line 61, delete "(ASIC)" and insert -- (ASIC(s)) --, therefor.

In Column 7, Line 64, delete "device's" and insert -- devices --, therefor.

In Column 10, Line 53, in Claim 8, delete "and respectively" and insert -- respectively --, therefor.

In Column 11, Line 9, in Claim 12, delete "configured to" and insert -- configured to: --, therefor.

In Column 11, Line 53, in Claim 15, delete "first and first respectively" and insert -- respectively --, therefor.

Signed and Sealed this  
Eighteenth Day of September, 2018

Andrei Iancu  
*Director of the United States Patent and Trademark Office*